United States Patent Office 3,019,259
Patented Jan. 30, 1962

3,019,259
1,4-DIHYDRO-1,4-METHANONAPHTHALENE-5,8-DIAMINE
Joseph E. Dunbar, Midland, Mich., assignor to The Dow Chemical Company, Midland, Mich., a corporation of Delaware
No Drawing. Filed Nov. 2, 1959, Ser. No. 850,022
8 Claims. (Cl. 260—556)

The present invention is directed to aromatized cyclopentadiene adducts of p-benzoquinonediimines and more specifically to 1,4-dihydro-1,4-methanonaphthalene-5,8-diamines having the structure

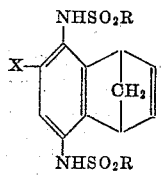

In this and succeeding formulas, X is bromo, chloro, fluoro, methylthio or cyclohexylthio and R is lower-alkyl, phenyl, chlorophenyl or tolyl. By the expression "lower alkyl" is meant an alkyl radical containing from 1 to 4 carbon atoms, inclusive. The invention also relates to the methods for the preparation of these adducts.

The products of the present invention are white crystalline solids soluble in many organic solvents such as ethanol, methanol, isopropanol, benzene, toluene and xylene and substantially insoluble in water. The products have many agricultural applications such as inhibition of nitrification and as plant growth control agents.

The products of the present invention may be prepared by mixing together a p-benzoquinonediimine compound having the structure

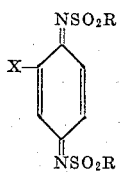

and cyclopentadiene in the presence of a tertiary amine. The reaction is usually carried out in an inert solvent such as benzene, toluene or xylene. The cyclopentadiene reactant is employed in an excess on a molar basis with respect to the p-benzoquinonediimine reactant, preferably a threefold molar excess or greater. It is also desirable that the cyclopentadiene be freshly prepared. The amount of tertiary amine catalyst employed may vary from a catalytic amount to an amount equimolar with respect to the p-benzoquinonediimine compound employed. Appropriate tertiary amines include triethylamine, trimethylamine and pyridine. The reaction takes place at a temperature of from 0° to 140° C. over a period of time ranging from 5 minutes to 2 hours to produce the desired 1,4-dihydro-1,4-methanonaphthalene-5,8-diamine product. The latter usually precipitates in the reaction mixture although some may remain in solution if excess solvent is employed. Excess solvent may be removed by evaporation to precipitate the desired product which may then be recovered by filtration and purified, if desired, by recrystallizing from suitable solvents such as glacial acetic acid, ethanol, methanol, benzene, ethyl acetate or mixtures thereof.

In a preferred method for carrying out the reaction, the appropriate p-benzoquinonediimine compound is dissolved in an inert solvent and a threefold or greater molar excess of freshly prepared cyclopentadiene and a catalytic amount of triethylamine added thereto. The mixture is then heated to the reflux temperature of the solvent and thereafter allowed to cool to room temperature whereupon the desired 1,4-dihydro-1,4-methanonaphthalene-5,8-diamine product precipctates as a crystalline solid. The latter is then recovered by filtration and purified according to conventional procedures.

The products of the present invention having the structure

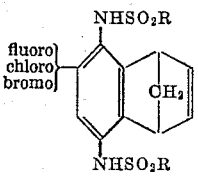

may be prepared by heating a 1,4,4a,8a-tetrahydro-1,4-methano-5,8-naphthoquinonediimine compound having the structure

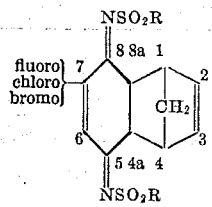

in an inert organic solvent in the presence of a catalytic amount of a tertiary amine. Heating is carried out at a temperature of from about 80° to 140° C. for a period of from about 5 minutes to 2 hours. Suitable tertiary amines for use as catalysts include triethylamine, trimethylamine and pyridine. Appropriate solvents for carrying out the reaction include benzene, toluene and xylene. During the heating, a reaction takes place and the desired 1,4-dihydro-1,4-methanonaphthalene-5,8-diamine is formed in the reaction mixture. The latter is recovered from the reaction mixture by vaporizing off a sufficient amount of the solvent to precipitate the product, recovering said product by filtration and recrystallizing from suitable solvents such as glacial acetic acid, ethanol, methanol, benzene, ethyl acetate or mixtures thereof.

In carrying out the reaction, the tetrahydromethanonaphthoquinonediimine compound is heated in an inert solvent at the reflux temperature in the presence of a tertiary amine catalyst until a change in the color of the reaction mixture is observed. Thereafter, the mixture is allowed to cool to room temperature whereupon the desired 1,4-dihydro-1,4-methanonaphthalene-5,8-diamine product usually precipitates in the reaction mixture. If no precipitation occurs, excess solvent is removed by vaporization until precipitation occurs. The precipitated solid is then recovered by filtration and purified by conventional procedures.

The following examples illustrate the invention but are not to be construed as limiting.

EXAMPLE 1

*6-chloro-1,4-dihydro-N,N'-bis(methylsulfonyl)-1,4-methanonaphthalene-5,8-diamine*

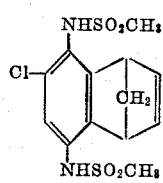

5.60 grams (0.055 mole) of triethylamine was added to a boiling solution of 18.1 grams (0.0500 mole)

of 6-chloro-N,N'-bis(methylsulfonyl)-1,4,4a,8a-tetrahydro-1,4-methano-5,8-naphthoquinonediimine in 250 milliliters of benzene. The color of the solution changed immediately on the addition of the amine from pale yellow to amber. The mixture was then allowed to cool to room temperature whereupon a 6-chloro-1,4-dihydro-N,N'-bis-(methylsulfonyl) - 1,4 - methanonaphthalene - 5,8-diamine product precipitated as a gray solid. The latter was recovered by filtration and purified by treating hot aqueous acetic solution thereof with activated charcoal, cooling to precipitate a light tan crystalline solid and repeatedly recrystallizing said solid with aqueous methanol to obtain a purified product as white crystals melting at 216.5°–217.5° C. The product had elemental analyses in percent as follows:

|  | Carbon | Hydrogen | Chlorine | Nitrogen | Sulfur |
| --- | --- | --- | --- | --- | --- |
| Theoretical | 43.03 | 4.17 | 9.77 | 7.72 | 17.67 |
| Found | 43.33 | 3.93 | 9.65 | 7.52 | 17.58 |

EXAMPLE 2

N,N'-bis(n-butylsulfonyl)-6-chloro-1,4-dihydro-1,4-methanonaphthalene-5,8-diamine

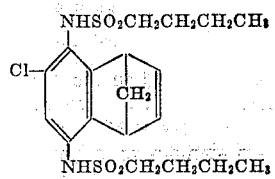

6 drops of triethylamine were added to a warm solution of 2.87 grams (0.00641 mole) of N,N'-bis(n-butylsulfonyl) - 6 - chloro - 1,4,4a,8a - tetrahydro-1,4-methano-5,8-naphthoquinonediimine in 25 milliliters of benzene whereupon the reaction mixture turned green immediately. The mixture was allowed to stand at room temperature for 1 hour during which time the color gradually turned to amber red. At the end of this period, the benzene solvent was removed by vaporization under reduced pressure to obtain as residue a red, gummy oil. The latter was dissolved in a small amount of hot aqueous acetic acid, the resulting solution treated with activated charcoal, filtered to remove the charcoal, and cooled to obtain a light tan colored solid. The latter was recrystallized from aqueous acetic acid to obtain an N,N'-bis(n-butylsulfonyl) - 6 - chloro - 1,4-dihydro-1,4-methanonaphthalene-5,8-diamine product as a white crystalline solid melting at 138°–139.5° C. The product had elemental analyses as follows:

|  | Carbon | Hydrogen | Nitrogen |
| --- | --- | --- | --- |
| Theoretical | 51.05 | 6.09 | 6.27 |
| Found | 51.26 | 6.08 | 6.26 |

EXAMPLE 3

In a reaction carried out in a manner similar to that above described, the following compounds are prepared:

6 - chloro - N,N' - bis(ethylsulfonyl) - 1,4 - dihydro-1,4-methanonaphthalene-5,8-diamine by heating 6-chloro-N,N'-bis(ethylsulfonyl)-1,4,4a,8a-tetrahydro-1,4-methano-5,8-naphthoquinonediimine in the presence of triethylamine catalyst.

6 - chloro - 1,4 - dihydro - N,N'-bis(isopropylsulfonyl)-1,4-methanonaphthalene-5,8-diamine by heating 6-chloro-1,4,4a,8a - tetrahydro - N,N' - bis(isopropylsulfonyl) - 1,4-methano-5,8-naphthoquinonediimine in the presence of a catalytic amount of triethylamine.

EXAMPLE 4

6-chloro-1,4-dihydro-N,N'-bis(p-chlorophenylsulfonyl)-1,4-methanonaphthalene-5,8-diamine

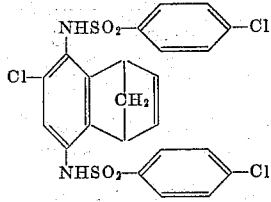

6 drops of triethylamine were added to a well stirred, boiling solution of 3.95 grams (0.00710 mole) of 6-chloro-N,N'-bis(p-chlorophenylsulfonyl)-1,4,4a,8a-tetrahydro-1,4-methano-5,8-naphthoquinonediimine in 80 milliliters of benzene. On the addition of the triethylamine the color of the solution changed immediately from yellow to amber. The reaction mixture was then allowed to cool to room temperature whereupon a light tan colored solid precipitated therein. The solid was purified by treating a boiling glacial acetic acid solution thereof with decolorizing charcoal and recrystallizing from the decolorized solution to obtain a 6-chloro-1,4-dihydro-N,N'-bis(p-chlorophenylsulfonyl) - 1,4 - methanonaphthalene - 5,8 - diamine product as a white solid melting at 242°–243° C. with decomposition. The product had elemental analyses in percent as follows:

|  | Carbon | Hydrogen |
| --- | --- | --- |
| Theoretical | 49.69 | 3.08 |
| Found | 49.83 | 3.31 |

EXAMPLE 5

In preparations carried out in a manner similar to that described in Example 4, the following compounds are prepared:

6 - chloro - 1,4 - dihydro - N,N'-bis(p-tolylsulfonyl)1,4-methanonaphthalene-5,8-diamine by heating a benzene solution of 6-chloro-1,4,4a,8a-tetrahydro-N,N'-bis(p-tolylsulfonyl)-1,4-methano-5,8-naphthoquinonediimine in the presence of triethylamine catalyst.

6 - chloro - 1,4 - dihydro-N,N'-bis(phenylsulfonyl)-1,4-methanonaphthalene-5,8-diamine by heating a solution of 6-chloro-1,4,4a,8a-tetrahydro-N,N'-bis(phenylsulfonyl)-1,4-methano-5,8-naphthoquinonediimine in benzene in the presence of triethylamine catalyst.

EXAMPLE 6

6-cyclohexylthio-N,N'-bis(methylsulfonyl)-1,4-dihydro-1,4-methanonaphthalene-5,8-diamine

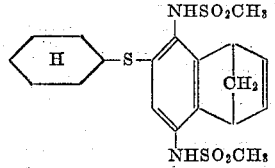

8.2 milliliters (6.6 grams; 0.10 mole) of freshly distilled cyclopentadiene was added to a solution of 6.79 grams (0.0180 mole) of 2-cyclohexylthio-N,N'-bis(methylsulfonyl)-p-benzoquinonediimine. The addition resulted in a color change from violet to amber within 2 minutes. To the resulting mixture was added 3 milliliters of triethylamine whereupon a brown solid began to precipitate slowly in the reaction mixture. The mixture was allowed to stand at room temperature for 2 hours and the solvent then removed under reduced pressure to obtain a brown semi-solid residue. The latter was purified by treating a hot glacial acetic acid solution thereof with activated charcoal and recrystallizing from glacial acetic acid to obtain a 6-cyclohexylthio-N,N'-bis(methylsulfonyl)-1,4- dihydro-1,4-methanonaphthalene-5,8-diamine product as a white crystalline solid melting at 183.5°–184° C. The product has elemental analysis as follows:

|  | Carbon | Hydrogen | Nitrogen |
|---|---|---|---|
| Theoretical | 51.56 | 5.92 | 6.33 |
| Found | 51.33 | 5.65 | 6.56 |

EXAMPLE 7

In reactions carried out as described in Example 6, the following compounds are prepared:

6 - cyclohexylthio - N,N' - bis(n - propylsulfonyl) - 1,4-dihydro-1,4-methanonaphthalene-5,8-diamine by the reaction of 2-cyclohexylthio-N,N'-bis(n-propylsulfonyl)-p-benzoquinonediimine and cyclopentadiene in the presence of triethylamine catalyst.

6-cyclohexylthio-N,N'-bis(m-tolylsulfonyl)-1,4-dihydro-1,4-methanonaphthalene-5,8-diamine by the reaction of 2 - cyclohexylthio - N,N' - bis(m - tolylsulfonyl) - p - benzoquinonediimine and cyclopentadiene in the presence of triethylamine catalyst.

EXAMPLE 8

*N,N'-bis(methylsulfonyl)-6-methylthio-1,4-dihydro-1,4-methanonaphthalene-5,8-diamine*

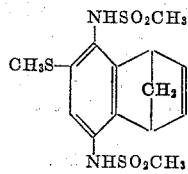

40 milliliters of cyclopentadiene were added to a solution of 9.25 grams (0.0300 mole) of N,N'-bis(methylsulfonyl)-methylthio-p-benzoquinonediimine in 800 milliliters of benzene. The color of the solution changed from deep red to yellow over a period of about 3 minutes. 5 milliliters of triethylamine were added to the resulting solution and the mixture boiled at reflux temperature for 20 minutes. During the heating, a crystalline solid formed and precipitated in the reaction mixture. The mixture was concentrated by evaporation of the solvent to a final volume of about 400 milliliters and then cooled to room temperature, whereupon a light tan colored precipitate formed. The latter was purified by decolorizing a solution thereof in boiling glacial acetic acid with activated charcoal and recrystallizing from the decolorized solution to obtain an N,N'-bis(methylsulfonyl)-6-methylthio - 1,4 - dihydro - 1,4 - methanonaphthalene - 5,8 - diamine product as a white crystalline solid melting at 243.5°–244° C. with decomposition. The product had elemental analyses as follows:

|  | Carbon | Hydrogen | Nitrogen |
|---|---|---|---|
| Theoretical | 44.90 | 4.84 | 7.48 |
| Found | 44.71 | 4.79 | 7.76 |

EXAMPLE 9

In operations carried out as described in Example 8, the following compounds are prepared:

N,N' - bis(secondary - butylsulfonyl) - 6 - methylthio-1,4-dihydro-1,4-methanonaphthalene-5,8-diamine by the reaction of N,N'-bis(secondary-butylsulfonyl)-methylthio-p-benzoquinonediimine and cyclopentadiene in the presence of triethylamine catalyst.

N,N' - bis(o - chlorophenylsulfonyl) - 6 - methylthio-1,4-dihydro-1,4-methanonaphthalene-5,8-diamine by the reaction of N,N'-bis(o-chlorophenylsulfonyl)-methylthio-p-benzoquinonediimine and cyclopentadiene in the presence of triethylamine catalyst.

EXAMPLE 10

*6-fluoro-N,N'-bis(methylsulfonyl)-1,4-methanonaphthalene-5,8-diamine*

To a well-stirred, boiling solution of 34.6 grams (0.100 mole) of 6-fluoro-N,N'-bis(methylsulfonyl)-1,4,4a,8a-tetrahydro-1,4-methano-5,8-naphthoquinonediimine in 500 milliliters of benzene is added 2 milliliters of triethylamine. The color of the solution changes immediately from yellow to amber. The reaction mixture is then allowed to cool to room temperature, whereupon a 6-fluoro - N,N' - bis(methylsulfonyl) - 1,4 - methanonaphthalene-5,8-diamine product precipitates as a crystalline material. The latter is purified by treating a glacial acetic acid solution thereof with activated charcoal and recrystallizing from the treated solution. The product has a molecular weight of 344.

EXAMPLE 11

In similar preparations, the following compounds are prepared:

6 - fluoro - N,N' - bis(n - propylsulfonyl) - 1,4 - methanonaphthalene-5,8-diamine by adding triethylamine to a hot benzene solution of 6-fluoro-N,N'-bis(n-propylsulfonyl) - 1,4,4a,8a - tetrahydro - 1,4 - methano - 5,8 - naphthoquinonediimine.

6 - fluoro - N,N' - bis(secondary - butylsulfonyl) - 1,4-methanonaphthalene-5,8-diamine by adding triethylamine to a hot benzene solution of 6-fluoro-N,N'-bis(secondary-butylsulfonyl) - 1,4,4a,8a - tetrahydro - 1,4 - methano-5,8-naphthoquinonediimine.

6 - fluoro - N,N' - bis(o - tolylsulfonyl) - 1,4 - methanonaphthalene-5,8-diamine by adding triethylamine to a hot benzene solution of 6-fluoro-N,N'-bis(o-tolylsulfonyl)-1,4,4a,8a - tetrahydro - 1,4 - methano - 5,8 - naphthoquinonediimine.

EXAMPLE 12

*6-bromo-1,4-dihydro-N,N'-bis(methylsulfonyl)-1,4-methanonaphthalene-5,8-diamine*

To a well-stirred, boiling solution of 40.7 grams (0.100 mole) of 6-bromo-N,N'-bis(methylsulfonyl-1,4,4a,8a-tetrahydro-1,4-methano-5,8-naphthoquinonediimine in 500 milliliters of benzene is added 2 milliliters of triethylamine. The color of the solution changes immediately from yellow to amber. The reaction mixture is then allowed to cool to room temperature whereupon a 6-bromo - 1,4 - dihydro - N,N' - bis(methylsulfonyl) - 1,4-methanonaphthalene-5,8-diamine product precipitates as a crystalline solid. The latter is purified as previously described by treating with activated charcoal and recrystallizing from glacial acetic acid. The product has a molecular weight of 405.

EXAMPLE 13

In similar preparations, the following compounds are prepared:

6 - bromo - 1,4 - dihydro - N,N' - bis(ethylsulfonyl)-1,4-methanonaphthalene-5,8-diamine by adding triethylamine to a hot benzene solution of 6-bromo-1,4-dihydro-N,N' - bis(ethylsulfonyl) - 1,4,4a,8a - tetrahydro - 1,4-methano-5,8-naphthoquinonediimine.

6 - bromo - 1,4 - dihydro - N,N' - bis(p - chlorophenylsulfonyl)-1,4-methanonaphthalene-5,8-diamine by adding triethylamine to a hot benzene solution of 6-bromo-1,4-dihydro - N,N' - bis(p - chlorophenylsulfonyl) - 1,4,4a, 8a-tetrahydro-1,4-methano-5,8-naphthoquinonediimine.

The products of this invention having the structure

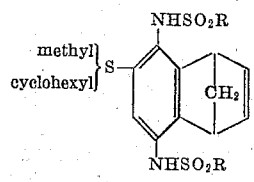

are useful for maintaining soil fertility by inhibiting the conversion of reduced nitrogen in the soil to nitrate and nitrite nitrogen. In a representative operation of its use as nitrification inhibitor, an aqueous ammonium sulfate solution containing 5 parts per million by weight of 6-cyclohexylthio - 1,4 - dihydro - N,N' - bis(methylsulfonyl)-1,4-methanonaphthalene-5,8-diamine is dipsersed throughout air-dried sandy loam soil, containing essentially no organic material and having been freed of nitrate and nitrite nitrogen by prior thorough leaching with water. The resulting treated soil is incubated at 25° C. for one week. At the end of this period, the soil is analyzed colorimetrically for nitrate and nitrite nitrogen and compared with a check soil similarly treated with an aqueous ammonium sulfate solution containing no 6-cyclohexy- thio - 1,4 - dihydro - N,N' - bis(methylsulfonyl) - 1,4-methano-5,8-diamine. It is found that in the soil treated with the composition containing 6-cyclohexylthio-1,4-dihydro - N,N' - bis(methylsulfonyl) - 1,4 - methano - 5,8-diamine there is substantially complete inhibition of nitrification whereas there is no inhibition of nitrification in the check soil.

The products having the structure

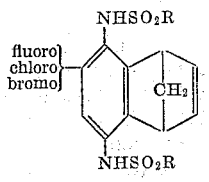

are useful as aquatic herbicides for the control of undesirable weeds and plants growing in water. In use, good controls of submersed and floating aquatic weeds are obtained when in separate operations, aquatic weeds are exposed to tanks containing 400 parts by weight of one of the compounds represented by above structure per million parts of aqueous medium.

The p-benzoquinonediimine compound reactants of the present invention having the formula

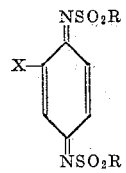

may be prepared by mixing a disulfonamide compound having the structure

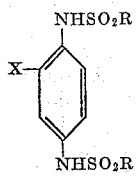

with a slight molar excess of lead tetraacetate in glacial acetic acid at a temperature of from −10° to 50° C. for a period of about 15 minutes to 1 hour, thereafter, adding a small amount of ethylene glycol to destroy unreacted lead tetraacetate, then diluting the resulting mixture with water to precipitate the desired p-benzoquinonediimine compound.

The disulfonamide compound employed above may be prepared according to one of the following methods, depending on the nature of X:

(1) When X is fluoro, chloro or bromo, an appropriate 2-halo-p-phenylenediamine is reacted with a sulfonyl chloride having structure, $RSO_2Cl$, to produce the disulfonamide having the structure

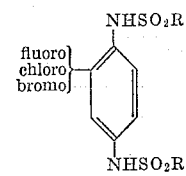

When the p-phenylenediamine employed above is 2-fluoro-p-phenylenediamine, the latter may be prepared by the reduction of 2-fluoro-4-nitroaniline with stannous chloride-hydrochloric acid.

(2) When X is methylthio, cyclohexylthio or chloro, an appropriate ring unsubstituted p-benzoquinonediimine compound having the structure

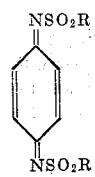

is mixed with methanethiol or cyclohexanethiol in the presence of a catlytic amount of tertiary amine or with hydrogen chloride in an inert solvent at a temperature of from about 0° C. to 50° C. for a period of from a few minutes to about 1 hour to obtain the desired disulfonamide compound.

The 1,4,4a,8a-tetrahydro-1,4-methano-5,8-naphthoquinonediimine reactants of the present invention having the formula

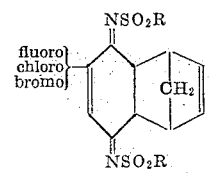

may be prepared by mixing together substantially equimolar proportions of a benzoquinonediimine having the formula

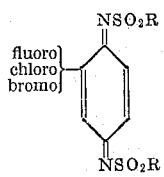

and prepared as previously described, with cyclopentadiene in an inert solvent such as chloroform at room temperature for a period of about 15 minutes to 1 hour, and thereafter vaporizing off the solvent to recover the 1,4,4a,8a - tetrahydro - 1,4 - methano - 5,8 - naphthoquinonediimine as residue.

I claim:
1. A 1,4-dihydro-1,4-methanonaphthalene-5,8-diamine of the formula

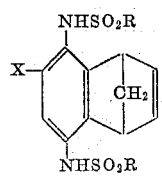

wherein X is selected from the group consisting of bromo, chloro, fluoro, methylthio and cyclohexylthio, and R is selected from the group consisting of lower-alkyl, phenyl, chlorophenyl and tolyl.

2. 6-chloro-1,4-dihydro-N,N'-bis(methylsulfonyl)-1,4-methanonaphthalene-5,8-diamine.

3. N,N'-bis(n-butylsulfonyl)-6-chloro-1,4-dihydro-1,4-methanonaphthalene-5,8-diamine.

4. 6-chloro-1,4-dihydro-N,N'-bis(p-chlorophenylsulfonyl)-1,4-methanonaphthalene-5,8-diamine.

5. 6-cyclohexylthio-N,N'-bis(methylsulfonyl)-1,4-dihydro-1,4-methanonaphthalene-5,8-diamine.

6. N,N'-bis(methylsulfonyl)-6-methylthio-1,4-dihydro-1,4-methanonaphthalene-5,8-diamine.

7. A method for preparing a 1,4-dihydro-1,4-methanonaphthalene-5,8-diamine of claim 1 which comprises mixing together in an inert solvent a p-benzoquinonediimine compound of the formula

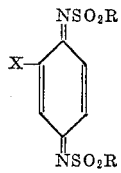

with cyclopentadiene in the presence of a catalytic amount of a tertiary amine and maintaining the reaction mixture at a temperature in the range of from 0° to 140° C. for a period of from 5 minutes to 2 hours, wherein X is selected from the group consisting of fluoro, chloro, bromo, methylthio and cyclohexylthio and R is selected from the group consisting of lower-alkyl, phenyl, chlorophenyl and tolyl.

8. A method for preparing a 1,4-dihydro-1,4-methanonaphthalene-5,8-diamine of the formula

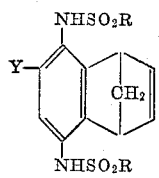

which comprises heating a 1,4,4a,8a-tetrahydro-1,4-methano-5,8-naphthoquinonediimine compound of the formula

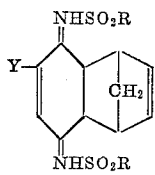

at a temperature of from 80° to 140° C. for a period of from about 5 minutes to 2 hours in the presence of a tertiary amine catalyst, wherein in the above formulas R is selected from the group consisting of lower-alkyl, phenyl, chlorophenyl and tolyl, and wherein Y is selected from the group consisting of bromo, chloro and fluoro.

References Cited in the file of this patent

Adams et al.: Bull. Soc. Chim., vol. January 1958, (Ser. 5), pages 24, 29, 30, 34 and 55 to 61, 1958.